UNITED STATES PATENT OFFICE 2,147,599

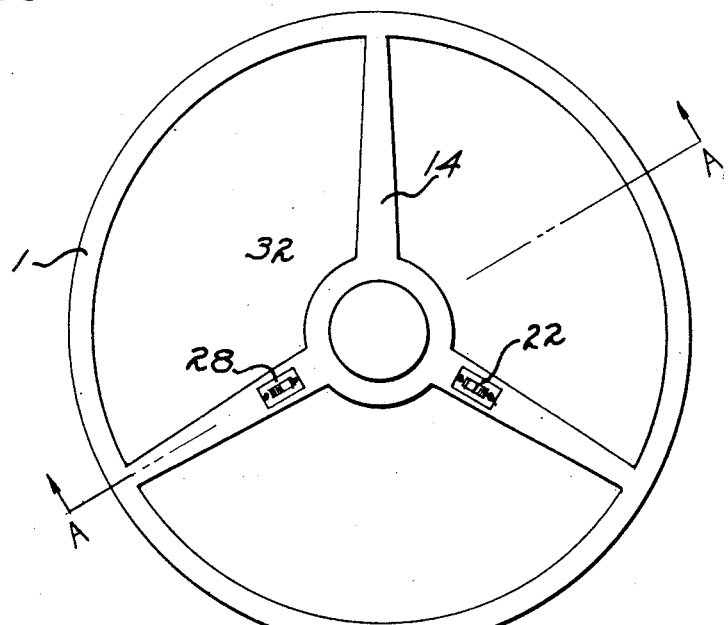
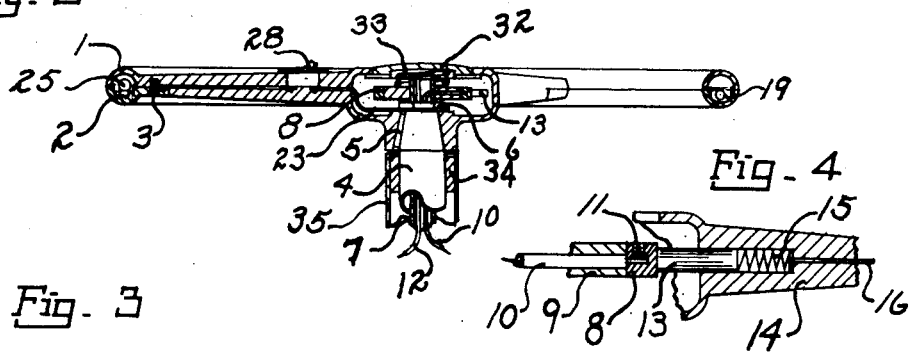
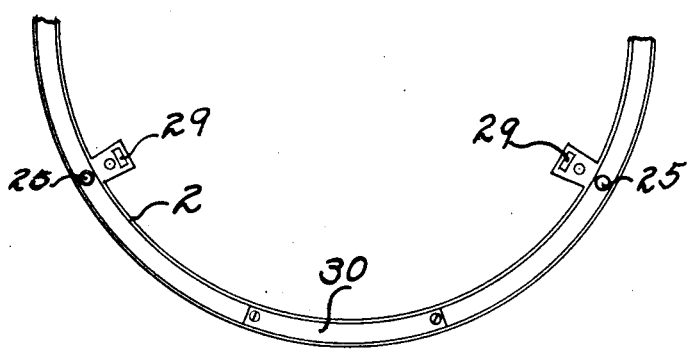

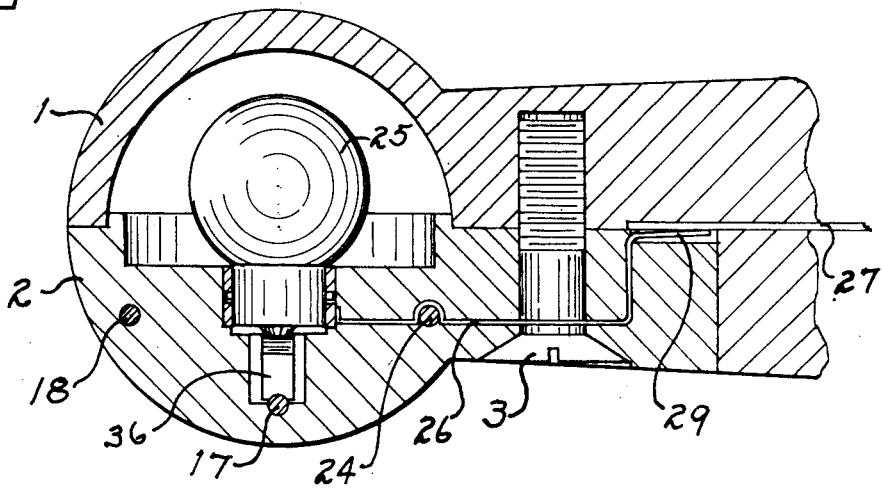
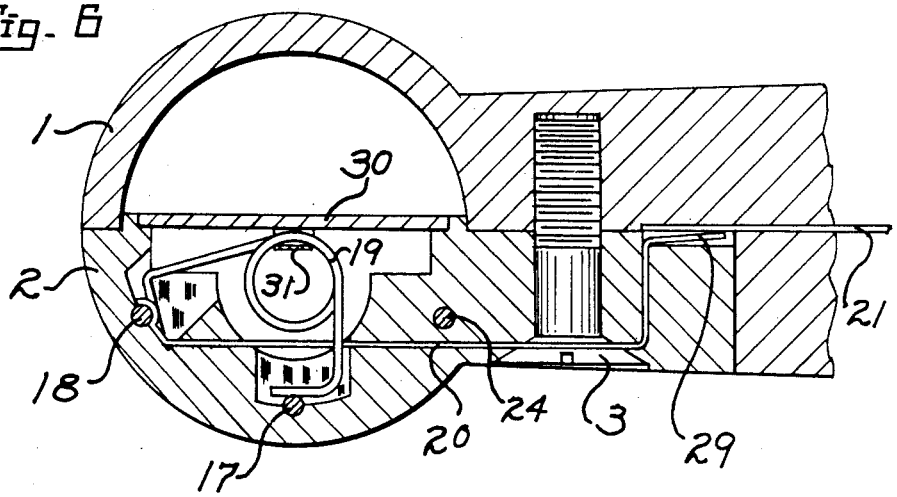
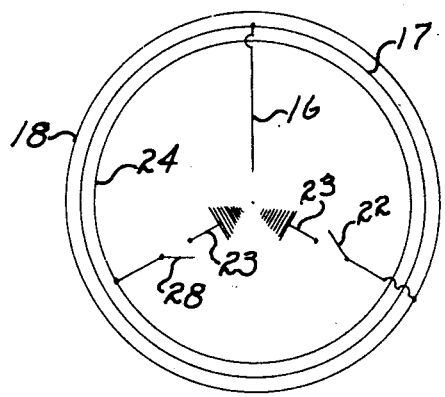

HEATED AND ILLUMINATED STEERING WHEEL

Otto Edward Becker, Los Angeles, Calif.

Application February 13, 1937, Serial No. 125,616

1 Claim. (Cl. 219—19)

The primary object of my invention is to provide a heated and illuminated steering wheel, wherein the heating and illuminating elements are within the rim of the wheel.

A further object of my invention is to provide a heated and illuminated steering wheel that has a conventional appearance.

A further object of my invention is to provide a heated and illuminated steering wheel wherein the heating and illuminating elements may be readily inspected and replaced.

A further object of my invention is to provide a heated and illuminated steering wheel that may be applied to existing steering gears.

With these and incidental objects in view, the invention consists in certain novel features of construction and combination of parts, a preferred form of which is hereinafter shown with reference to the drawings which accompany and form a part of this specification.

In the drawings:

Fig. 1 is a plan view of my steering wheel.

Fig. 2 is a cross-sectional view taken on line A—A, Fig. 1 looking in the direction indicated.

Fig. 3 is a fragmentary plan view of the removable element ring.

Fig. 4 is a fragmentary cross-sectional view of the electrical distributing ring and contact brush.

Fig. 5 is an enlarged fragmentary view of the steering wheel rim showing how the illuminating element is arranged.

Fig. 6 is an enlarged fragmentary cross-sectional view of the steering wheel rim, showing how the heating element is arranged.

Fig. 7 is a diagrammatical wiring diagram of the circuit.

Like reference characters refer to like parts throughout the several views.

My invention consists of a steering wheel 1, which has a detachable element ring 2. This ring is held in place by the screws 3. The wheel assembly is secured to the steering post 4, in the conventional manner, that is the shaft is tapered to fit the bore in the steering wheel. The key 5 keeps the wheel from turning on the shaft and the nut 6, keeps the wheel on the shaft. The stationary tube 7 passes through the steering post 4 and carries on its upper end the electrical distributing ring 8. The center portion 9, of this ring is a non-conductive substance which is pressed on to the stationary tube 7. A hole is provided in the stationary tube 7 and the distributing ring 8 to receive the hot wire 10. I provide a set screw 11 to grip the end of the wire 10 and make a good electrical contact. The wire 10, passes through the center tube 7 and to its electrical source of supply. The horn wire 12 is also disposed in the center tube 7. The brush 13 is slidably disposed in the spoke 14 and is held in frictional contact with the distributing ring 8, by the spring 15. This spring contacts the conductor 16, which delivers current to the center wire 17 located in the removable ring. This wire serves as one side of the circuit for the heating and illuminating elements. The outer wire 18 serves as the other side of the circuit for the heating elements 19 and is conducted to ground through the conductors 20, 21, the switch 22 and the conductor 23 which is gripped under the nut 6. The inner wire 24 serves as the grounded side of the circuit for the lighting elements 25 and is conducted to ground through the conductors 26, 27, the switch 28 and the conductor 23. The conductors 20 and 26 are preferably made of a spring like material having the free ends 29 which press tightly against the conductors 16, 21, and 27 when the element ring is in place. From this it may be seen that when the screws 3 are removed the element ring 2 may be removed without severing any electrical conductors. The rim of the steering wheel 1, is preferably made of a transparent or translucent material so that the rays of the illuminating elements may pass through and be visible to the operator. The element ring 2 is preferably made of a non-conductive heat resisting material and need not be transparent. I provide a covering 30 for the heating elements so that they will not be visible through the transparent wheel. The support 31 is provided in order to hold the heating elements in place. The horn button 32 is placed central of the wheel. It is obvious, however, that a lighting switch may also be placed within this space. The spring 33 holds the horn button in an upward position. The steering post 4 is journalled on the bushing 34 which is pressed into the mast jacket 35. A multiplicity of illuminating and heating elements may be used and not confined to three as I show in the drawings.

While the form of mechanism herein shown and described is admirably adapted to fulfill the object primarily stated, it is to be understood that it is not intended to confine the invention to the one form of embodiment herein shown and described, as it is susceptible of embodiment in various forms, all coming within the scope of the claim which follows.

What I claim is:

A steering wheel having a divided rim, one half of said rim being integrally secured to the wheel, an element ring constituting the lower half of the rim, said ring having three endless conductors disposed therein, a multiplicity of heating elements placed in spaced relationship on the element ring, said heating elements being secured to the conductors, said conductors extending through the spokes of the wheel to a source of current and a switch disposed in each of the two circuits formed by said conductors.

OTTO EDWARD BECKER.